(12) United States Patent
Schwepper (10) Patent No.: US 11,619,836 B2
(45) Date of Patent: Apr. 4, 2023

(54) DRIVE CIRCUIT FOR DRIVING AN ELECTRO-OPTICAL DEVICE

(71) Applicant: Inalfa Roof Systems Group B.V., Oostrum (NL)

(72) Inventor: Gerrit Schwepper, Kamp-Lintfort (DE)

(73) Assignee: INALF ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 17/317,541

(22) Filed: May 11, 2021

(65) Prior Publication Data

US 2021/0356772 A1 Nov. 18, 2021

(30) Foreign Application Priority Data

May 13, 2020 (EP) .................................. 20174337

(51) Int. Cl.
*G02F 1/01* (2006.01)
*G02F 1/133* (2006.01)
(Continued)

(52) U.S. Cl.
CPC ........ *G02F 1/0121* (2013.01); *G02F 1/13306* (2013.01); *B60J 3/04* (2013.01); *B60J 7/043* (2013.01); *B60J 7/0573* (2013.01); *E05F 15/643* (2015.01); *E05Y 2201/434* (2013.01); *E05Y 2201/654* (2013.01); *E05Y 2201/684* (2013.01); *E05Y 2900/542* (2013.01); *G02F 1/1334* (2013.01); *G02F 1/172* (2013.01)

(58) Field of Classification Search
CPC .................................................. G02F 1/13306
See application file for complete search history.

(56) References Cited

U.S. PATENT DOCUMENTS 3,453,517 A * 7/1969 Kennedy ................. H02P 7/295
318/507
2008/0224674 A1* 9/2008 Hasegawa ............. H02M 3/158
323/282

(Continued)

FOREIGN PATENT DOCUMENTS

DE 102015101956 A1 8/2016

OTHER PUBLICATIONS

European Search Report in corresponding European Patent Application No. 20174337.4 dated Sep. 17, 2020.

*Primary Examiner* — Sang V Nguyen
(74) *Attorney, Agent, or Firm* — Steven M. Koehler; Westman, Champlin & Koehler, P.A.

(57) ABSTRACT

A drive circuit for driving an electro-optical device like an optically switchable glazing, e.g. a glass panel provided with a PDLC or SPD layer, comprises a set of input terminals for receiving an alternating input voltage at a first frequency; a set of output terminals for supplying an alternating output voltage at a second frequency; a control circuit generating a control signal dependent on an input signal, the input signal representing a charge state of the electro-optical device; and a current-direction circuit for controlling a current-flow direction of an electrical current in response to the control signal. The control circuit and the current-direction circuit are thereby configured to control the second frequency such that the electro-optical device is prevented from degradation, while keeping an energy consumption low.

15 Claims, 7 Drawing Sheets

(51) Int. Cl.
*E05F 15/643* (2015.01)
*B60J 3/04* (2006.01)
*B60J 7/043* (2006.01)
*B60J 7/057* (2006.01)
*G02F 1/1334* (2006.01)
*G02F 1/17* (2019.01)

(56) References Cited

U.S. PATENT DOCUMENTS

| | | |
|---|---|---|
| 2010/0315693 A1 | 12/2010 | Lam et al. |
| 2013/0208333 A1 | 8/2013 | Lam et al. |
| 2014/0354940 A1 | 12/2014 | Lam et al. |
| 2016/0077400 A1 | 3/2016 | Lam et al. |
| 2018/0210308 A1 | 7/2018 | Lam et al. |
| 2019/0041668 A1* | 2/2019 | Neic .................. G05F 1/12 |
| 2020/0033687 A1 | 1/2020 | Lam et al. |

* cited by examiner

DRIVE CIRCUIT FOR DRIVING AN ELECTRO-OPTICAL DEVICE

BACKGROUND

The discussion below is merely provided for general background information and is not intended to be used as an aid in determining the scope of the claimed subject matter.

The invention relates to a drive circuit for driving an electro-optical device such as a switchable glazing having a polymer dispersed liquid crystal (PDLC) layer or a suspended particle device (SPD) layer incorporated.

Open roof assemblies are well known in the art. The known open roof assemblies are arranged on a roof of a vehicle, wherein an opening is provided in the roof. A moveable closure member is selectively in an open position or in a closed position. In the open position, an interior of the vehicle is in open contact with an exterior of the vehicle, e.g. for providing fresh air in the interior. In the closed position, the interior of the vehicle is closed and protected against rain and other external influences, for example. In the known open roof assembly, the closure member may be (semi-)transparent to allow sunlight to enter the interior, when the closure member is in the closed position.

In prior art, a vehicle roof glazing is usually provided with a rollable or shiftable light blocking member to reduce an amount of light entering a passenger compartment. In more recent years, switchable glass, which is also known as e.g. smart glass, is being considered for light control. A switchable glass may be an electro-optical device, in which case an optical transparency of the glass may be changed by application of an electrical voltage or current.

Known electro-optical switchable glass technologies include polymer dispersed liquid crystal (PDLC) technology and suspended particle device (SPD) technology. Both electro-optical glazing types are best operated by application of an alternating-current (AC) voltage, preferably a DC-free AC voltage, to prevent electrochemical decomposition.

If no voltage is applied, the above-mentioned electro-optical glazing types are in a hazed or darkened state. Application of a voltage increases the transparency. Commonly, a AC voltage of 60 V or higher is applied to achieve a maximum transparency. On the other hand, in a vehicle, there is only a 12 V DC voltage from a battery available. Therefore, the available DC voltage needs to be transformed to an AC voltage and the voltage level needs to be increased. In a vehicle, however, it is preferred to use a low voltage as much as possible for safety reasons.

Further, any electronic components for generating and supplying the drive voltage to the switchable glass are to be arranged safely and should not take more space than strictly necessary, in particular when the switchable glass is mounted on a moving closure member in a roof of the vehicle. Also, electromagnetic interference should be kept to a minimum.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In a first aspect, a drive circuit for driving an electro-optical device comprises a set of input terminals for receiving an alternating input voltage at a first frequency; a set of output terminals for supplying an alternating output voltage at a second frequency; a control circuit generating a control signal dependent on an input signal, the input signal representing a charge state of the electro-optical device; and a current-direction circuit for controlling a current-flow direction of an electrical current in response to the control signal. The control circuit and the current-direction circuit of the drive circuit are thereby configured to control the second frequency. Allowing the drive circuit to adapt the second frequency enables to adapt to changing circumstances, while maintaining a low power consumption by keeping the second frequency as low as possible.

A charge state of the electro-optical device is monitored for switching the current direction. When the electro-optical device is charged to a certain level, the current direction is reversed. With a lower input voltage, it will take longer to arrive at such charge level, while with an increased input voltage level, it will take a shorter period. In view of preventing degradation of the electro-optical device, the output voltage needs to switch current direction regularly, while on the other hand power consumption increases with an increased frequency. So, a drive circuit is provided to prevent degradation of the electro-optical device, while reducing the power consumption irrespective of circumstances, like an actual input voltage level.

Moreover, the drive circuit does not require any clock signal, frequency signal or any other kind of timing signal to control the second frequency. This provides an advantage of a simpler and more cost-effective drive circuit.

In an embodiment, the first frequency is higher than the second frequency.

In an embodiment of the drive circuit, the control signal has two possible states and the current-direction circuit is configured to allow current to flow in only one of two possible directions dependent on an actual state of the control signal. In such embodiment, a level of the input circuit may have any value, while the control signal has a predetermined level. For example, the control signal may have one of two possible states, although it is contemplated that more than two states may be available.

In a particular embodiment thereof, the control circuit comprises a bistable multivibrator circuit. For example, the bistable multivibrator circuit may be a flip-flop device. The bistable multivibrator circuit is known as such and changes an output signal when an input signal exceeds a predetermined level. In the drive circuit, the input signal may be changing gradually over time, while the electro-optical device is being charged. As soon as the charge exceeds a predetermined level, the input signal exceeds a corresponding level and the bistable multivibrator circuit changes the output signal resulting in a change of current direction. After the switch in current direction, the input signal starts changing again, until the electro-optical device is charged to the predetermined level again, and so on.

As described herein, the control signal has at least two possible states. It is noted that the control signal may comprise multiple output signals on a corresponding number of output terminals. In particular, in an embodiment, the control signal comprises two output signals, wherein in a first state a first one may have a high level while a second one has a low level and in a second state the first one may have a low level while the second one has a high level.

In an embodiment, the control circuit comprises an integrator circuit, wherein the integrator circuit is connected such that a voltage at the one of the set of output terminals determines a charging of the integrator circuit. Charging of the electro-optical device may be mimicked by a representative integrator circuit connected at a same output terminal. Hence, the charge state of the integrator circuit represents the charge state of the electro-optical device.

In a further embodiment, the integrator circuit comprises an RC integrator circuit, wherein a series connection of a resistor and a capacitor is connected between two output terminals of the set of output terminals. The control circuit is configured to use a node voltage at a node between the resistor and the capacitor as the input voltage. While charging the capacitor, the node voltage at the node between the capacitor and the resistor gradually changes representing a charge state of the capacitor, which is representative of the charge state of the electro-optical device, as above elucidated.

In a particular embodiment, a resistance of the resistor of the integrator circuit is selectable for controlling the second frequency. The integrator circuit may be matched to a particular input voltage or a particular electro-optical device or any other elements by a calibration procedure once, for example. In a particular embodiment, the variable resistance may be controlled in response to certain properties or circumstances. For example, if the electro-optical device exhibits a temperature-dependent charging behavior, a temperature-dependent resistor may be used or a control unit may control the variable resistor in response to a sensed temperature. Other properties, that affect the charging behavior, may be used as well as apparent to those skilled in the art. In another approach, the second frequency may be monitored and when the second frequency gets outside a predetermined range, the variable resistance may be controlled such that the second frequency gets in the predetermined range again.

In an embodiment, the current-direction circuit comprises a first direction-controlling element and a second direction-controlling element and wherein the control signal determines which of the first direction-controlling element and the second direction-controlling element is enabled to conduct an electrical current. For example, a direction-controlling element may be a thyristor as a controllable diode or a diode combined with a switch like a MOSFET. Any other circuit arrangement or electronic component for controlling a current direction may be employed as well, of course.

In an embodiment, the control circuit comprises a microcontroller device configured to control the control signal in dependence of the input signal. Using a microcontroller, any kind of control method may be embodied. For example, using a current probe on one of the output terminals, the charge in the electro-optical device may be precisely monitored as well as the development of the current over time during charging. Based on any predetermined desired considerations and assumptions, the control signal may be controlled and supplied to the current-direction circuit.

In an embodiment, a voltage control circuit may be provided for controlling the output voltage level. The voltage control circuit may be arranged in any part of the drive circuit or may even be provided as a separate circuit part. For example, the voltage control circuit may be configured and arranged to control a source voltage that is provided to a primary winding of a transformer, while a secondary winding of the transformer outputs the input voltage of the drive circuit. The voltage control circuit provides an even further control for managing and controlling the electro-optical device. In particular, with use of a suitably programmed micro-controller, complex schemes and procedures may be employed to balance the charging with other requirements and features. For example, electro-optical devices with different charging behavior may be combined and controlled with a single drive circuit or intermediate optical states, like an intermediate dimming state, may be provided and controlled.

In an embodiment, the drive circuit is coupled to at least one optically switchable film. In a particular embodiment, the drive circuit is coupled to a plurality of segments of one or more optically switchable films.

In an aspect, an open roof assembly comprising a moveable closure member, wherein the moveable closure member comprises an electro-optical device and wherein a transformer and a drive circuit as described above for driving the electro-optical device are mounted on the closure member. Selecting a suitably high frequency of the input voltage enables to use a small transformer. Such a small transformer may be mounted on the moveably arranged closure member. As a result, electrical supply cabling to the closure member only needs to provide a low voltage to the closure member and only close to the electro-optical device a high voltage is generated and supplied. Such a layout of the electrical circuitry is advantageous in particular for safety reasons as an electrical cabling between a vehicle body and the moveable closure member merely carries a safe voltage.

It is noted that the above-mentioned open roof assembly comprises the drive circuit. It is contemplated that the drive circuit may be another drive circuit, provided that the drive circuit is configured to receive a relatively high frequency supply voltage such that a small transformer can be used to increase the voltage from a low voltage to a high voltage. Moreover, apart from an electro-optical device, any other electric circuit or device arranged on the moveable closure member and requiring a high voltage may be supplied with a suitable high supply voltage by using a small transformer mounted on the closure member and, where required, providing suitable drive circuitry for adapting the high frequency high voltage to a supply voltage suitable for the specific electric circuit or device.

In a further aspect, the present invention provides a method according to claim 12. The method of driving an electro-optical device comprises the steps of receiving an alternating input voltage at a first frequency at a set of input terminals; and generating an alternating output voltage at a second frequency at a set of output terminals. The second frequency is controlled by the steps of generating a control signal dependent on an input signal, the input signal representing a charge state of the electro-optical device; and controlling a current-flow direction of an electrical current in response to the control signal.

In an embodiment, the method further comprises a step of determining an actual condition of the electro-optical device and wherein the step of generating the alternating output voltage at the second frequency at the set of output terminals comprises taking into account the actual condition. Such actual condition may be temperature, for example. Switchable optical layers like PDLC or SPD may exhibit electrical properties that are dependent on a condition like temperature. An optimal driving voltage or driving current is obtainable, when such dependency of a condition is taken into account.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description with reference to the appended schematical drawings.

DETAILED DESCRIPTION OF THE ILLUSTRATIVE EMBODIMENTS

The present invention will now be described with reference to the accompanying drawings, wherein the same reference numerals have been used to identify the same or similar elements throughout the several views.

Figure 1A:
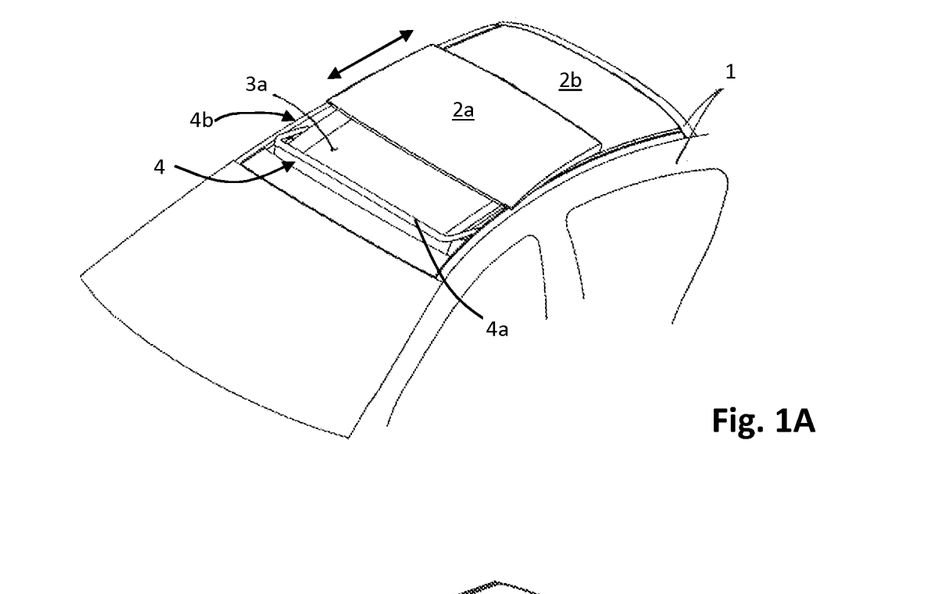
FIG. 1A shows a perspective view of a vehicle roof with an open roof assembly.

FIG. 1A illustrates a vehicle roof 1 having an open roof assembly arranged therein. The open roof assembly comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2a may be in a tilted position, which is a position wherein a rear end RE of the moveable panel 2a is raised as compared to the closed position, while a front end FE of the moveable panel 2a is still in the closed position. Further, the moveable panel 2a may be in an open position, which is a position wherein the moveable panel 2a is slid open and the first roof opening 3a is partly or completely exposed.

It is noted that the illustrated vehicle roof 1 corresponds to a passenger car. The present invention is however not limited to passenger cars. Any other kind of vehicles that may be provided with a moveable panel are contemplated as well.

Figure 1B:
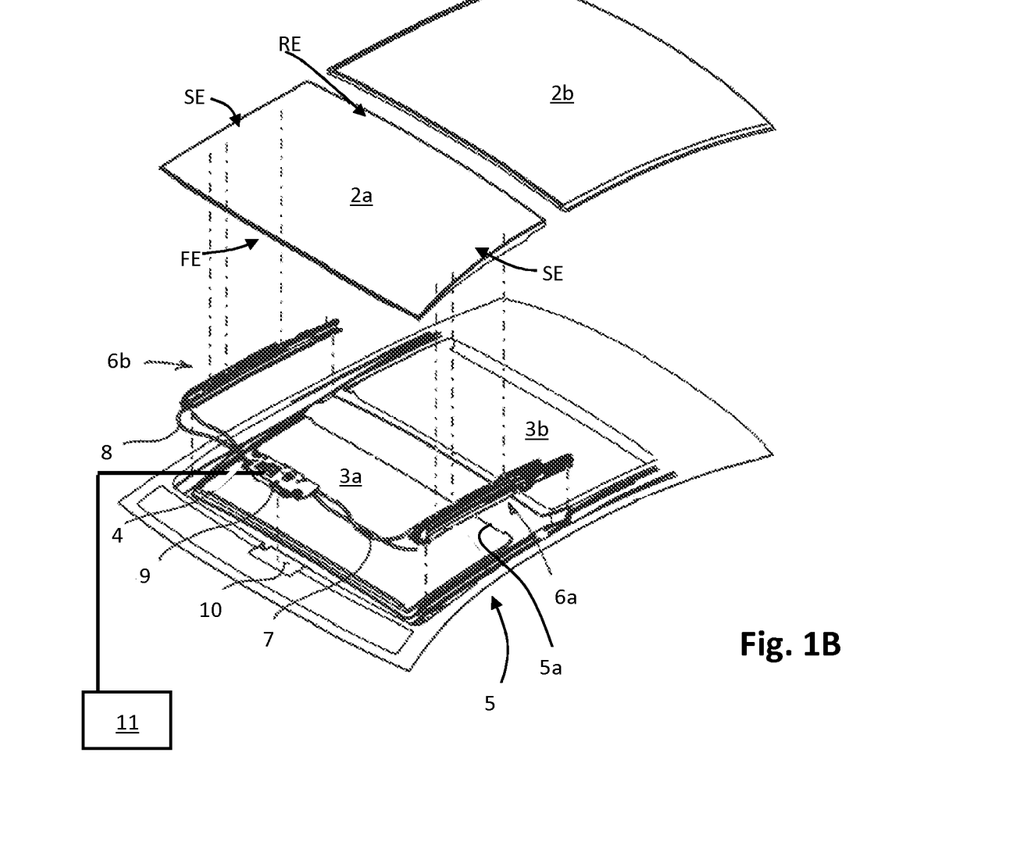
FIG. 1B shows an exploded view of the open roof assembly of FIG. 1A.

FIG. 1B illustrates the same vehicle roof as shown in FIG. 1A having panels 2a and 2b. In particular, while FIG. 1A shows the open roof assembly in the open position, FIG. 1B is an exploded view of the open roof assembly in a closed position. Further, in this exploded view of FIG. 1B, it is shown that there is a second roof opening 3b. The first and second roof openings 3a, 3b are provided in a frame 5 of the open roof assembly. An edge 5a of the frame 5 defines the first roof opening 3a.

The second roof opening 3b is arranged under the fixed panel 2b such that light may enter a vehicle interior passenger compartment through the fixed panel 2b, presuming that the fixed panel 2b is a glass panel or a similarly transparent panel, for example made of a plastic material or any other suitable material. The second roof opening 3b with a transparent or translucent fixed panel 2b is optional and may be omitted in another embodiment of the open roof assembly.

The wind deflector 4 is commonly a flexible material, e.g. a woven or non-woven cloth having through holes arranged therein or a web or net. The flexible material is supported by a support structure 4a, e.g. a bar-like or tube-like structure, which structure is hingedly coupled, directly or indirectly, to the frame 5 at a hinge 4b.

The wind deflector 4 is arranged in front of the first roof opening 3a and adapts air flow when the moveable panel 2a is in the open position. In its raised position, the wind deflector 4 reduces inconvenient noise due to air flow during driving. When the moveable panel 2a is in the closed position or in the tilted position, the wind deflector 4 is held down below the front end FE of the moveable panel 2a.

Usually, the wind deflector 4 is raised by a spring force when the moveable panel 2a slides to an open position and the wind deflector 4 is pushed down by the moveable panel 2a when the moveable panel 2a slides back into its closed position. In FIG. 1A, the moveable panel 2a is shown in an open position and the wind deflector 4 is shown in a raised position. In FIG. 1B, the moveable panel 2a is shown in a closed position and the wind deflector 4 is correspondingly shown in a position in which it is held down.

FIG. 1B further illustrates a drive assembly having a first guide assembly 6a, a second guide assembly 6b, a first drive cable 7 and a second drive cable 8. The first and second guide assemblies 6a, 6b are arranged on respective side ends SE of the moveable panel 2a and may each comprise a guide and a mechanism. The guide is coupled to the frame 5, while the mechanism comprises moveable parts and is slideably moveable in the guide. The first and the second drive cables 7, 8 are provided between the mechanisms of the respective guide assemblies 6a, 6b and a electric motor 9.

The drive cables 7, 8 couple the electric motor 9 to the mechanisms of the respective guide assemblies 6a, 6b such that upon operating the electric motor 9, the mechanisms start to move. In particular, a core of the drive cable 7, 8 is moved by the electric motor 9 such to push or pull on the mechanisms of the respective guides 6a, 6b. Such a drive assembly is well known in the art and is therefore not further elucidated herein. Still, any other suitable drive assembly may be employed as well without departing from the scope of the present invention. Moreover, in a particular embodiment, an electric motor may be operatively arranged between the respective guides and the respective mechanisms of the guide assemblies 6a, 6b and, in such embodiment, a drive assembly may be omitted completely.

In the illustrated embodiment, the guide assemblies 6a, 6b may start movement with raising the rear end RE of the moveable panel 2a, thereby bringing the moveable panel 2a in the tilted position. Then, from the tilted position, the guide assemblies 6a, 6b may start to slide to bring the moveable panel 2a in the open position. The present invention is however not limited to such embodiment. For example, in another embodiment, the moveable panel 2a may be moveable to a tilted position by raising the rear end RE, while an open position is reached by first lowering the rear end RE and then sliding the moveable panel 2a under the fixed panel 2b or any other structure or element provided behind the rear end RE of the moveable panel 2a. In further exemplary embodiments, the moveable panel 2a may be merely moveable between a closed position and a tilted position or between a closed position and an open position.

In the illustrated embodiment, the electric motor 9 is mounted near or below the front end FE of the moveable panel 2a at a recess 10. In another embodiment, the electric motor 9 may be positioned at any other suitable position or location. For example, the electric motor 9 may be arranged near or below the rear end RE of the moveable panel 2a or below the fixed panel 2b.

A control unit 11 is schematically illustrated and is operatively coupled to the electric motor 9. The control unit 11 may be any kind of processing unit, either a software controlled processing unit or a dedicated processing unit, like an ASIC, which are both well known to those skilled in the art. The control unit 11 may be a stand-alone control unit or it may be operatively connected to another control unit, like a multipurpose, generic vehicle control unit. In yet another embodiment, the control unit 11 may be embedded in or be part of such a generic vehicle control unit. Essentially, the control unit 11 may be embodied by any control unit suitable for, capable of and configured for performing operation of the electric motor 9 and thus the moveable roof assembly.

Figure 2A:
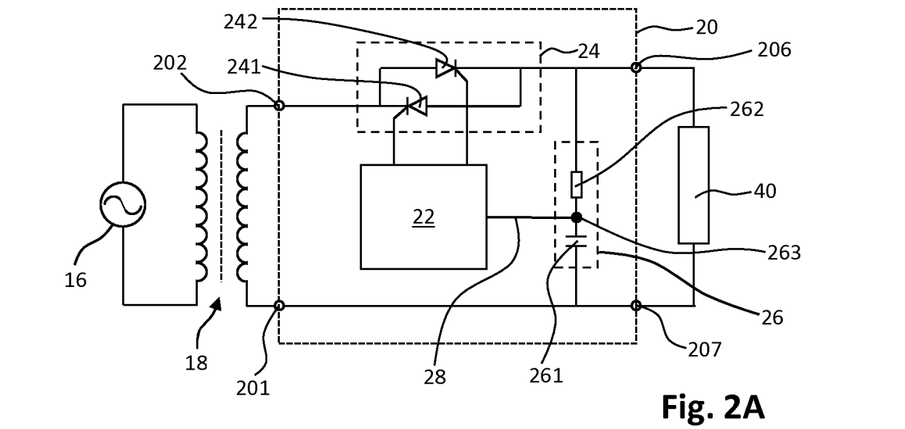
FIG. 2A shows a diagram of a first embodiment of a drive circuit.

In the open roof assembly according to FIGS. 1A and 1B, an electro-optical device may be provided. For example, an PDLC or SPD transparency controlling layer may be embedded in the glass panel of the closure member 2a or the fixed panel 2b. FIG. 2A shows a drive circuit 20 for providing a suitable supply voltage to such an electro-optical device 40.

As illustrated in FIG. 2A, an alternating voltage source 16 provides an alternating voltage to a primary winding of a transformer 18. The alternating (AC) voltage source 16 may be provided in a vehicle and may be configured to provide a suitable AC voltage from a DC voltage from a battery of the vehicle, for example. Any other AC voltage source 16 may be employed as well. The present invention is not limited with respect to the AC voltage source 16. In a preferred embodiment, the AC voltage from the AC voltage source 16 is a low voltage, but this is not required. Further, in a preferred embodiment, a frequency of the AC voltage is a relatively high frequency, preferably 500 HZ or higher, more preferably over 1 kHz and possibly even over 2 kHz as an increase in frequency allows for a decrease in size of the transformer 18. If the size of the transformer 18 is not relevant in a certain application, the frequency of the AC voltage supplied by the AC voltage source may not be relevant. Moreover, the particular frequency and an accuracy of the frequency is generally of low importance, when using the drive circuit as the drive circuit will adapt automatically to the frequency and amplitude of the supplied AC voltage as is elucidated hereinbelow.

A secondary winding of the transformer 18 is connected between a first input terminal 201 and a second input terminal 202 of the drive circuit 20. An amplitude of the AC voltage supplied to the first and second input terminals 201, 202 is determined by a ratio of windings of the primary winding and the secondary winding of the transformer 18 and an amplitude of the AC voltage supplied by the AC voltage source 16, as well known to those skilled in the art.

Between a first output terminal 206 and a second output terminal 207 of the drive circuit 20, the electro-optical device 40 is connected. The drive circuit 20 supplies an output voltage at the set of output terminals 206, 207 for controlling optical properties of the electro-optical device 40. If the electro-optical device 40 is an PDLC or SPD switchable layer, the output voltage may be preferred to be a relatively low-frequency, high-voltage AC output voltage for preventing degradation of the switchable layer, while keeping energy consumption low.

The drive circuit 20 comprises a current-direction circuit 24 which is configured to allow current to flow only in a predetermined direction. In particular, the current-direction circuit 24 may be controlled by one or more signals defining in which direction a flow of electrical current is allowable. In the illustrated embodiment, the current-direction circuit 24 comprises a first thyristor 241 and a second thyristor 242, wherein the thyristors 241, 242 are connected in anti-parallel. Switching one of the thyristors 241, 242 conductive by providing an high voltage on the gate of the first thyristor 241 allows an electrical current to flow in a first direction. Switching the high voltage to the gate of the second thyristor 242 allows the current to flow in an opposite second direction. As apparent to those skilled in the art, providing the gate of each thyristor 241, 242 with a high voltage allows a current in both directions and switching both gates to a sufficiently low voltage switches both thyristors 241, 242 non-conductive. Other embodiments of the current-direction circuit 24 are contemplated as well. For example, each thyristor 241, 242 may be replaced by a switch and a diode or the thyristors 241, 242 may be replaced by a series connection of two MOSFET's with their body diode's connected in anti-series. The present invention is not limited to the particular embodiment of the current-direction circuit 24.

It is further contemplated, for example, that the current-direction circuit 24 is embodied such that a low control signal controls the current-direction circuit 24 to allow current in the first direction, while a high control signal controls the current-direction circuit 24 to allow current in the opposite, second direction.

A control circuit 22 supplies the control signal to the current-direction circuit 24, wherein the control signal may be embodied as a single voltage signal; a multiple, parallel voltage signal; or even a multiplexed signal depending on the particular embodiment of the current-direction circuit 24.

The control circuit 22 controls the current-direction circuit 24 in response to an input signal 28. The input signal 28 is representative of a charge state of the electro-optical device 40. As soon as the electro-optical device 40 is (almost) fully charged, the current direction is switched by the control circuit 22.

The control circuit 22 may, for example, be embodied as a bistable multivibrator like a flip-flop. Essentially, the control circuit 22 has a predetermined number of output signals as the control signal. For example, the control signal may have either one of two voltage output levels: a low voltage or a high voltage. As soon as the input voltage exceeds a first threshold, the control signal becomes a high voltage. Then, the current direction is switched and the input voltage decreases and switches polarity. Then, when the input voltage exceeds a second threshold, the control signal is switched to a low voltage. Thus, the process repeats itself. The frequency of the repetition is determined by the speed of charging of the electro-optical device 40. Moreover, the frequency of the repetition determines the AC frequency of the AC output voltage, which corresponds to the second frequency of the present invention.

As above-described, the control signal output by the control circuit 22 is in accordance with a hysteresis loop. Other circuitry than a bistable multivibrator can be used as well as apparent to those skilled in the art. For example, a microprocessor may be suitable. In view of cost-effectiveness, the microprocessor may be preferred if further functionality may be controlled by such microprocessor.

The input signal 28 represents a charge state of the electro-optical device 40. While within the scope of the present invention, deriving such charge state directly from the electro-optical device 40 may prove to be challenging. Therefore, in the illustrated embodiment, an integrator circuit like an RC-circuit 26 is connected between the two output terminals 206, 207. The RC-circuit 26 comprises a resistor 262 and a capacitor 261. The resistor 262 and the capacitor 261 are connected in series with a node 263 in between. A node voltage at the node 263 is used as the input signal 28.

The capacitor 261 is charged with the output voltage over the output terminals 206, 207 similar to the electro-optical device 40. Selecting a suitable resistance of the resistor 262 and a suitable capacitance of the capacitor 261 provides a charge behavior that mimics the charge behavior of the electro-optical device 40. Then, the node voltage at the node 263 represents the charge state of the electro-optical device 40. Based on the charge state, the control circuit 22 is configured to switch current direction at a most suitable timing that keeps energy consumption low with a low frequency AC output voltage, while preventing degradation of the electro-optical device 40.

It is noted that additional components or circuitry may be added. For example, additional diodes or thyristors may be provided. Based on the operation of the current-direction circuit 24 and the AC input voltage at the input terminals 201, 202, about 50% of the time, no input voltage is applied. During a period of no input voltage, a current flow in a circuit part formed by the electro-optical device 40 and the RC-circuit 26 may be generated, affecting the charge state of the electro-optical device 40 and the charge state of the RC circuit 26. Depending on design and selected properties like resistance and capacitance, it may be preferred to add an additional current-direction circuit like the current-direction circuit 24 in the above-mentioned circuit part.

It is further noted that in certain embodiments, also one or more of the hereinbelow described embodiments, for proper operation, such an additional current-direction circuit may be preferred or even required. For example, in the below described embodiment of FIG. 2C, multiple electro-optical devices 40a-40c are connected in parallel. The generated current may be significant such that an additional current-direction circuit 26 may be preferred. In embodiments, wherein multiple integrating circuits, like the RC circuit 26, are provided, additional current-direction circuits may be highly preferred.

Figure 2B:
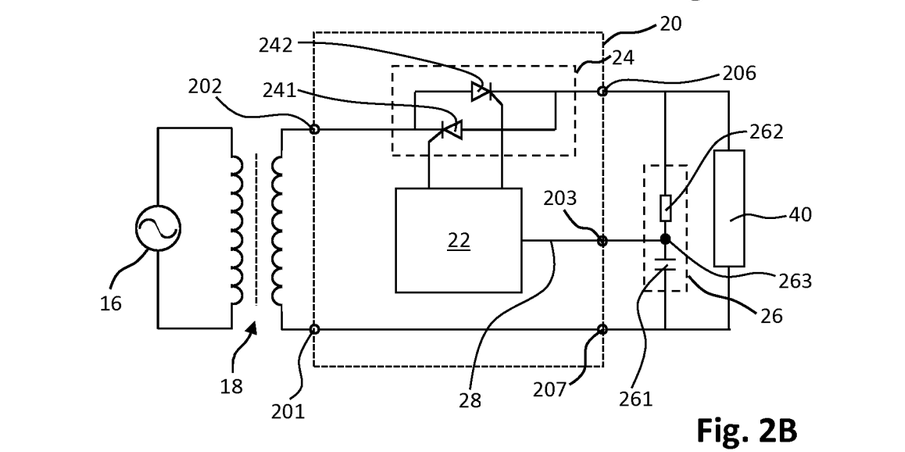
FIG. 2B shows a diagram of a second embodiment of a drive circuit.

As illustrated in FIG. 2B, the RC circuit 26—or any other circuit providing the input signal 28—is not necessarily a part of the drive circuit 20. For example, the drive circuit 20 may be provided with a third input terminal 203 for receiving the input signal 28. Such a design may enable to manufacture the drive circuit 20 independent of properties of an electro-optical device 40 to be driven as the RC circuit 26 may be selected and connected later.

For sake of clarity, in the other drawings, the dashed box indicating the drive circuit 20 and the corresponding terminals 201, 202, 203, 206 and 207 are omitted, as the definition and limitations thereof are believed to be apparent to those skilled in the art based on FIGS. 2A and 2B. For example, it will be apparent to the skilled person that, in an embodiment, the transformer 18 may be considered to form a part of the drive circuit 20 as well.

Figure 2C:
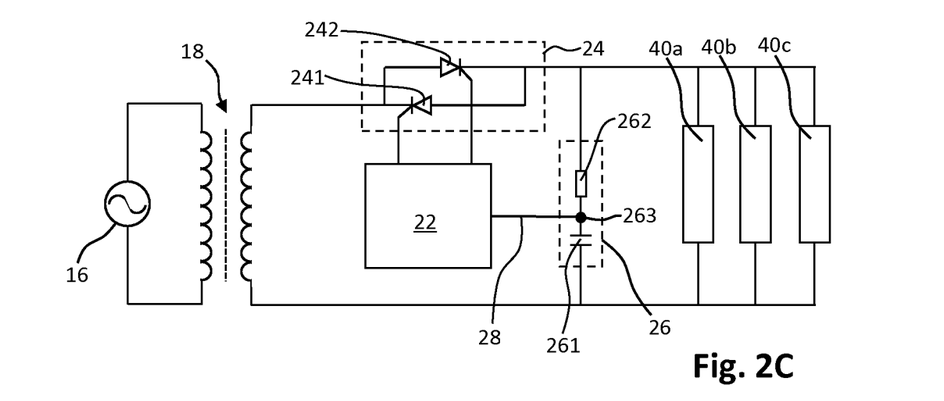
FIG. 2C shows a diagram of a third embodiment of a drive circuit.

In the third embodiment illustrated in FIG. 2C, the drive circuit is connected to three electro-optical devices 40a, 40b and 40c. These three electro-optical devices 40a, 40b, 40c may be three physically separated devices, e.g. embedded in three separate windows, e.g. side windows of a vehicle or separate glass panels of an open roof assembly (cf. moveable panel 2a and fixed panel 2b illustrated in FIGS. 1A and 1B). In another or a further embodiment, the three electro-optical devices 40a, 40b, 40c form segments of a physically single device, wherein the segments may be formed by application of segmented electrodes, functionally separating the single device in three individually controllable segments.

If the three electro-optical devices 40a, 40b, 40c have similar charging behavior, a single RC circuit 26 will represent the charge state of each of the three electro-optical devices 40a, 40b, 40c. Therefore, a single RC circuit 26 suffices.

Figure 3A:
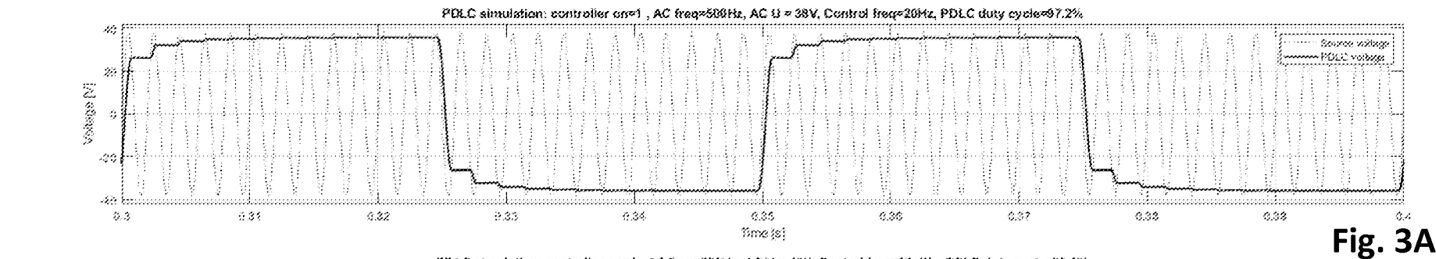
FIGS. 3A-3C show a graph of an input voltage and an output voltage of the first embodiment or second embodiment according to FIG. 2A or 2B, respectively.
Figure 3B:
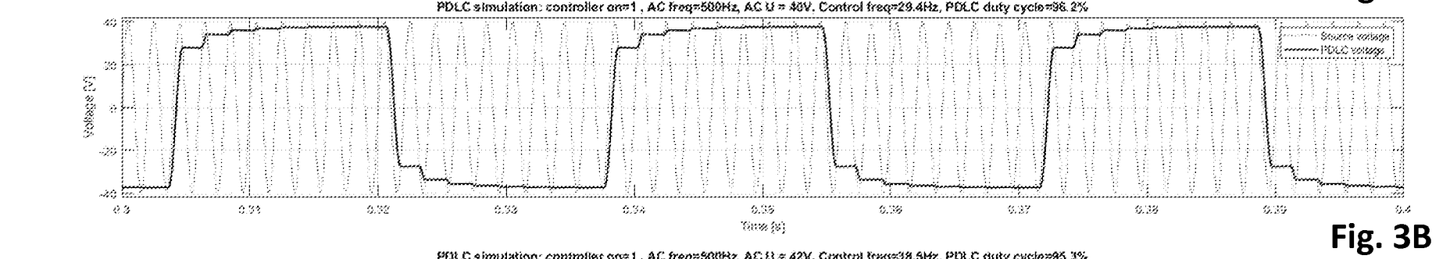
Figure 3C:
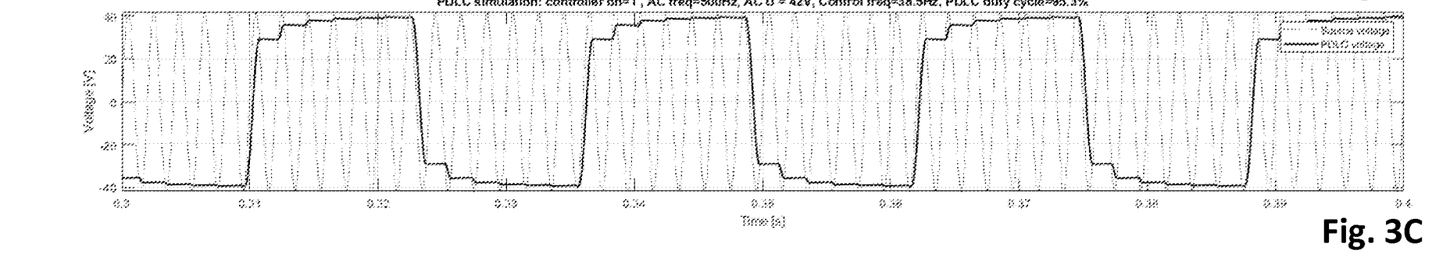

FIGS. 3A-3C illustrate the operation of the drive circuit. An input voltage and an output voltage, generated in a simulation, are plotted over time. The input voltage is plotted with a dotted line. As apparent from the graphs of FIGS. 3A—3C, the input voltage has an AC frequency of 500 Hz.

The output voltage is plotted with a solid line. It is noted that the illustrated output voltage is the voltage at the node of the RC-circuit representing the actual output voltage.

A maximum amplitude of the output signal is similar to a maximum amplitude of the input voltage as a ratio of a number of windings of the primary winding and the secondary winding of the transformer is selected to be 1 in this simulation. In a practical embodiment, these maximum amplitudes may be suitably selected based on an available input voltage and a desired output voltage. Only for purposes of illustration, the ratio has been selected as 1 in this simulation.

In FIG. 3A, a maximum amplitude of the input signal and the output signal is 38 V. At time 0.35 s, for example, the output voltage is at about −38 V, indicating that the electro-optical device 40 is about fully charged such that switching polarity is advised to prevent degradation. Therefore, the current-direction circuit is switched and the output voltage increases in a first cycle of the AC input voltage to about 28 V. In next cycles, the output voltage increases further to about 38 V at time 0.375 s. Then, the current direction is switched again and the output voltage falls to about −28 V in the first cycle after the switch. This process repeats itself and, thus, an AC output voltage is generated at an AC frequency of about 20 Hz with an almost square wave shape.

When the AC input voltage amplitude is about 40 V, the graph of FIG. 3B results. The shape of the output voltage remains the same as the shape of the output voltage in FIG. 3A, but the AC frequency of the output voltage is significantly changed to about 29.4 Hz, since the electro-optical device and the RC circuit are charged faster to a level where switching is advised to prevent degradation. With an even higher AC input voltage amplitude of 42 V as illustrated in FIG. 3C, the Ac frequency of the output voltage increases to about 38.5 Hz.

Figure 4A:
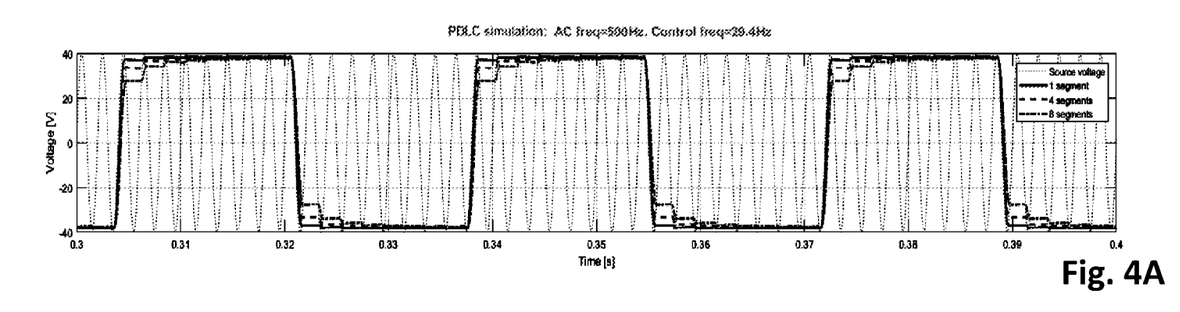
FIG. 4A shows a graph of an input voltage and an output voltage of the third embodiment according to FIG. 2C.

In FIG. 4A, the AC input voltage and the AC output voltage, determined as the representative node voltage, of the embodiment of FIG. 2C is shown, wherein the dotted line represents the AC input voltage of 500 Hz and an amplitude of 40 V over time. A solid line represents the AC output voltage with one electro-optical device 40 connected. A dashed line corresponds to an embodiment having four segments or devices connected in parallel and a dot-dashed line corresponds to an embodiment having eight segments or devices connected in parallel. As apparent from FIG. 4A, the number of connected electro-optical devices does not affect the AC frequency of the output voltage.

Figure 4B:
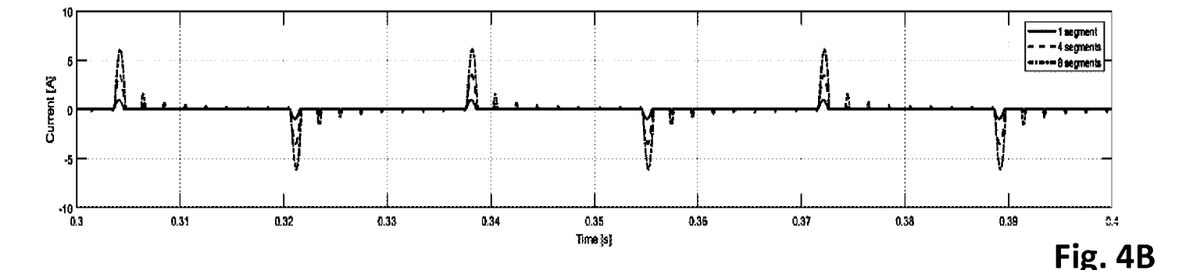
FIG. 4B shows a graph of an output current of the third embodiment according to FIG. 2C.

FIG. 4B illustrates the output current depending on the number of connected electro-optical devices, wherein the different lines correspond to the lines presented in FIG. 4A. As apparent from FIG. 4B, the output current increase proportional to the number of connected electro-optical devices, as could be expected.

Figure 4C:
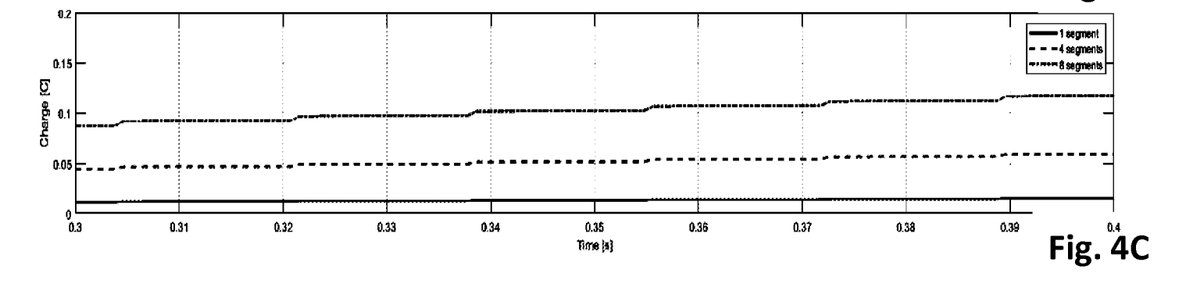
FIG. 4C shows a graph of a charge of the third embodiment according to FIG. 2C.

FIG. 4C illustrates an electrical charge applied depending on the number of connected electro-optical devices, wherein the different lines correspond to the lines presented in FIGS. 4A and 4B. As apparent from FIG. 4C and as could be expected, the amount of charge is proportional to the number of connected electro-optical devices or segments thereof.

Figure 5A:
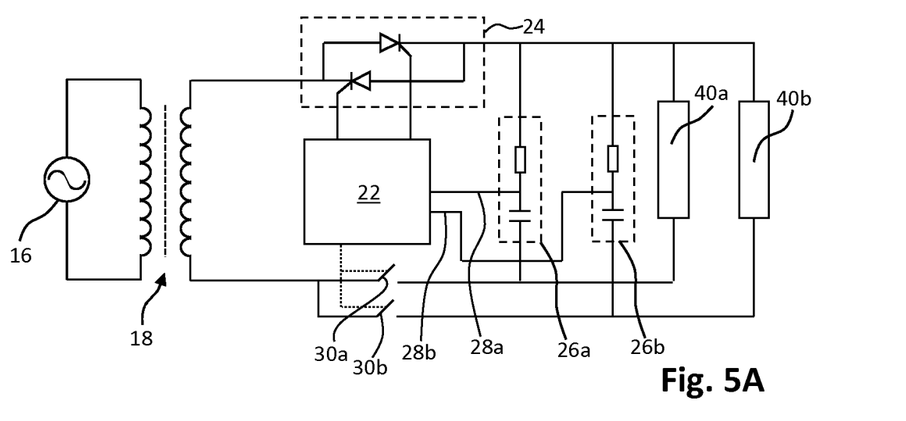
FIG. 5A shows a diagram of a fourth embodiment of a drive circuit.

FIG. 5A illustrates a fourth embodiment, wherein a first switch 30*a* and a second switch 30*b* are connected to a first electro-optical device 40*a* and a second electro-optical device 40*b*, respectively. Further, a first RC circuit 26*a* and a second RC circuit 26*b* are provided. It is noted that one or more further current-direction circuits may be needed to prevent cross-talk and undesirable current generation as above described.

The first and second switches 30*a*, 30*b* may be manually operated or electronically operated and, in the latter case, they may be operated by the control circuit 22, as illustrated by dotted connecting lines. While more control is possible in this embodiment, switching of the current-direction is still performed for both electro-optical devices 40*a*, 40*b* at the same time.

Figure 5B:
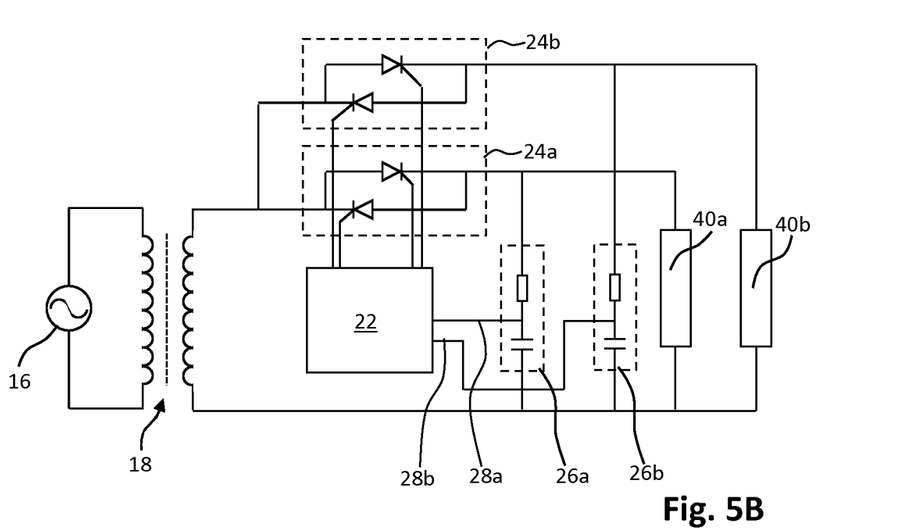
FIG. 5B shows a diagram of a fifth embodiment of a drive circuit.

In the fifth embodiment of FIG. 5B, the first and second electro-optical devices 40*a*, 40*b* are individually switchable by use of a first and a second current-direction circuit 24*a*, 24*b*, respectively. In this embodiment, the control circuit 22 is configured to control each of the current-direction circuits 24*a*, 24*b* with an individual control signal having at least three possible states: in a first state, one of the thyristors is switched conductive; in a second state, the other one of the thyristors is switched conductive; and in a third state, none of the thyristors is switched conductive. As above-mentioned, additional current-direction circuitry may be added to prevent an undesired current flow between electro-optical devices 40*a* and 40*b* and the RC circuits 26*a*, 26*b*, respectively, in time periods in which no current can flow from the transformer 18 to the electro-optical devices 40*a*, 40*b* and the RC circuits 26*a*, 26*b*.

The fifth embodiment of FIG. 5B enables fully independent drive and control of each electro-optical device 40*a*, 40*b*. Switching of polarity of the AC output voltage may be shifted in time to lower a peak current, thereby lowering a peak load on the AC voltage source 16.

The integrating RC circuit 26 of the above-described embodiments may be embodied differently. In the sixth embodiment of FIG. 6, the integrating circuit 26 comprises a current detection circuit 32, e.g. a current probe or a resistor with a small resistance combined with a voltage sensor. Suitable circuitry, e.g. a micro-processor or suitable analogue circuitry, is configured to integrate the current over time to determine an amount of charge supplied to the electro-optical device 40. The integrating circuit 26 further generates and outputs the input signal 28 corresponding to the detected amount of charge.

Figure 6:
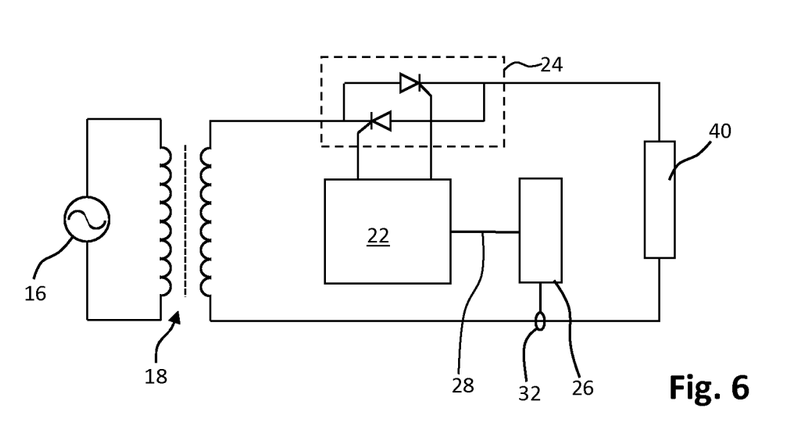
FIG. 6 shows a diagram of a sixth embodiment of a drive circuit.

In this sixth embodiment, in particular if the integrating circuit 26 comprises a micro-controller for integrating the current, the input signal 28 may be embodied as a signal having two possible states, e.g. a high state and a low state, wherein the low state indicates that the current direction is to be maintained for charging the electro-optical device 40 and a high state to indicate that a current direction is to be reversed. Moreover, the integrating circuit 26 may be combined with the control circuit 22 in a single micro-processor.

More in general, the present invention is not limited to any particular embodiment of the control circuit 22 and how the input signal 28 is generated. So, any integration of the control circuit 22 and any circuitry for generating the input signal 28 is contemplated.

Figure 7:
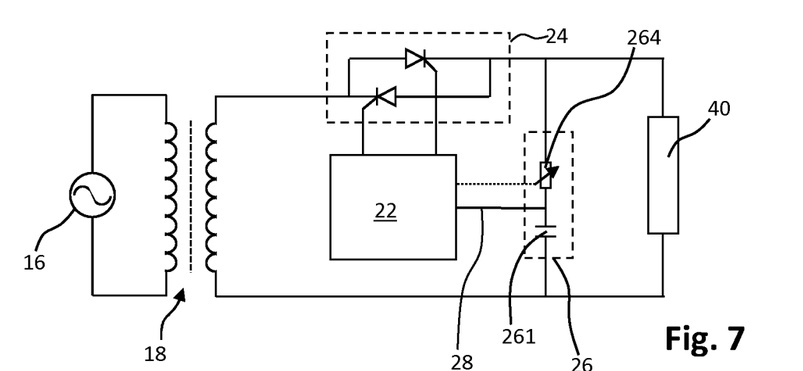
FIG. 7 shows a diagram of a seventh embodiment of a drive circuit.

FIG. 7 illustrates a seventh embodiment, wherein the RC circuit 26 is provided with a variable resistor 264 having a variable resistance. With a manually controllable resistance, the drive circuit may be configured to be operated with a wide range of electro-optical devices, wherein the charging of the integrating RC circuit 26 may be adapted to a connected electro-optical device 40 by adapting the resistance of the variable resistor 264.

In a particular embodiment, the variable resistor 264 may have an electronically controllable resistance. In such embodiment, the control circuit 22 may be configured to control the resistance of the variable resistor 264. For example, a charging property of the electro-optical device 40 may not be constant, e.g. may be dependent on temperature. To compensate for the varying charging behavior, the control circuit 22 may adapt the resistance of the variable resistor 264 in response to a detected temperature.

It is noted that in particular for an open roof assembly of a vehicle, a wide range of operating temperatures may occur. On a sunny summer day, temperature at a vehicle roof may increase to about 80 degrees Celsius, while on a winter day, temperature may decrease to −30 degrees Celsius or even lower. Hence, if a temperature dependency is present, a drive circuit may be preferred to be able to adapt the driving current, e.g. the AC frequency of the driving current, to the actual temperature. Of course, such an adapting drive circuit is not limited to a drive circuit. Other drive circuits may be configured to adapt to actual circumstances and conditions in relation to the charging behavior of the electro-optical device 40 as well. For example, the drive circuit disclosed in US2019/0041668 may be configured to adapt the AC frequency of the output voltage in response to certain conditions.

Similar results may, of course, be achieved in other embodiments. For example, the capacitor 261 may have a variable capacitance or the integrating circuit 26 may be embodied differently such that the input signal 28 is adapted to the varying charging behavior of the electro-optical device 40.

Figure 8A:
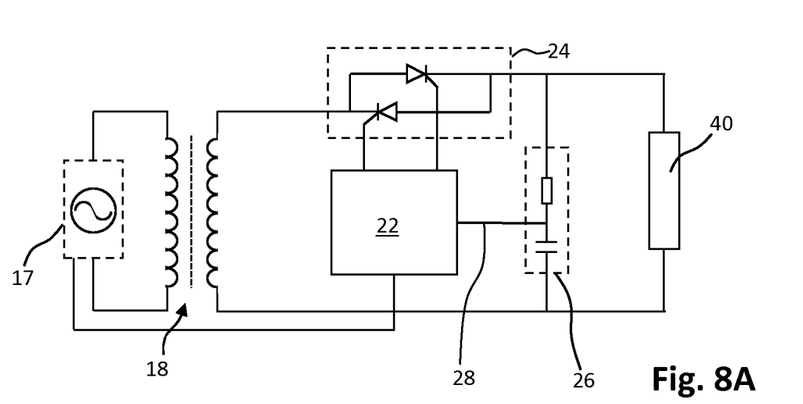
FIG. 8A shows a diagram of an eighth embodiment of a drive circuit.
Figure 8B:
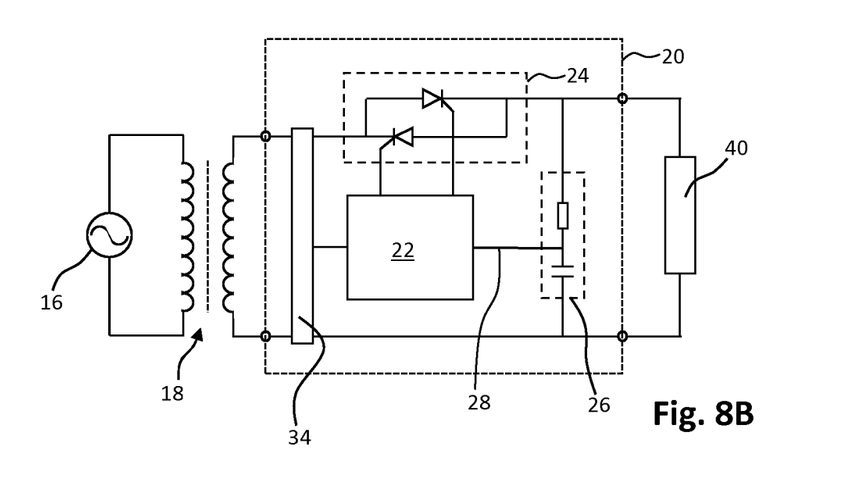
FIG. 8B shows a diagram of a ninth embodiment of a drive circuit.

To provide more control over the charging behavior of the electro-optical device 40, the eighth and ninth embodiments of FIGS. 8A and 8B, respectively, are provided with a controllable voltage amplitude. Such a controllable voltage amplitude may be used for providing an intermediate state of the electro-optical device 40, e.g. instead of only providing a fully transparent state or a fully opaque state, also providing a semi-transparent state.

In the eighth embodiment of FIG. 8A, the control circuit 22 is operatively coupled to the AC voltage source 17, wherein an output voltage amplitude of the AC voltage source 17 may be varied.

In the ninth embodiment of FIG. 8B, an additional voltage regulating circuit 34 is comprised in the drive circuit 20, which may be preferred compared to the eighth embodiment, if the AC voltage source 16 does not have a controllable AC voltage amplitude, is arranged relatively far away from the drive circuit 20, for example. The voltage regulating circuit 34 may take any suitable form. Alternatively or additionally, the transformer 18 may be embodied like a variac, wherein the connection to the second winding is adaptable such that the number of windings of the second winding is variable.

The voltage may be gradually controllable or may be controlled to have one of a limited number of possible amplitudes. Further, the voltage amplitude may be electronically controlled by the control circuit 22 or another control circuit or may be manually controllable.

Figure 9:
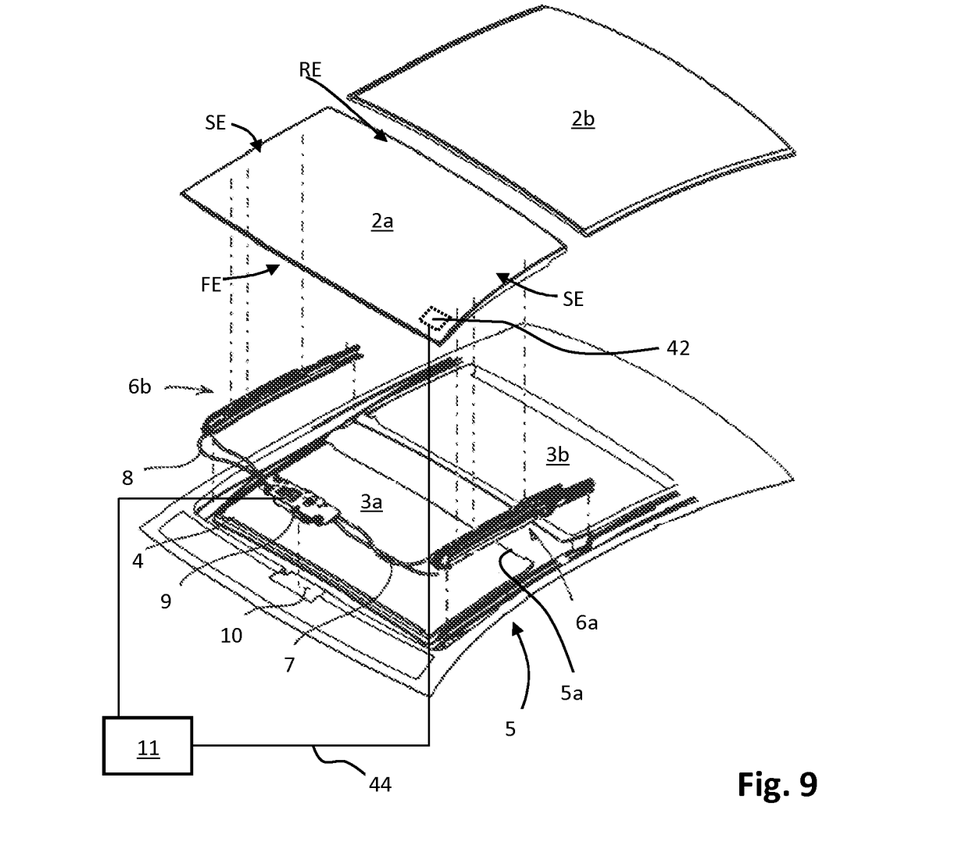
FIG. 9 shows a schematic exploded view of an open roof assembly comprising a drive circuit.

FIG. 9 shows the exploded view of FIG. 1B of an open roof assembly. In the illustrated open roof assembly, the moveable closure member 2a is provided with a switchable glass panel, wherein the switchable functionality is provided by a PDLC layer stacked between two layers of glass, for example. The PDLC layer forms an electro-optical device, which is controlled by a drive unit 42, wherein the drive unit 42 comprises a transformer and a drive circuit. An AC supply voltage may be provided by the control unit 11 over a supply cable 44 or may be supplied over a separate cabling. The cabling between the control unit 11 and the drive unit 42 may also be used for providing user control signals, like signals for switching the PDLC on or off. In another embodiment, there may be no operative coupling between the control unit 11 and the drive unit 42, e.g. if a user interaction module is provided on or in the closure member 2a such that only an AC supply voltage is needed for operation.

Arranging the transformer on the closure member 2a provides an advantage with respect to safety in view of the high voltage needed to drive the electro-optical PDLC layer as above described. However, the present invention is not limited to any embodiment wherein the transformer is small and arranged on a moveable closure member. On the other hand, it is also noted that providing the transformer on the moveable closure member does not necessarily require a drive circuit and other drive circuits for lowering an AC frequency of the output voltage may be applied as well for achieving the advantages of a transformer arranged on the closure member. Further, it is noted that the same advantages are achieved with arranging the transformer and drive circuit on a fixed glass panel or any other kind of glass panel, thereby keeping a length of high-voltage cabling short.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. A drive circuit for driving an electro-optical device, the drive circuit comprising
a set of input terminals for receiving an alternating input voltage at a first frequency;
a set of output terminals for supplying an alternating output voltage at a second frequency;
a control circuit configured to generate a control signal dependent on an input signal, the input signal representing a monitored charge state of the electro-optical device; and
a current-direction circuit configured to control a current-flow direction of an electrical current between the input and output terminals in response to the control signal, the control circuit and the current-direction circuit thereby being configured to control the second frequency based on the monitored charge state of the electro-optical device.

2. The drive circuit according to claim 1, wherein the first frequency is higher than the second frequency.

3. The drive circuit according to claim 1, wherein the control signal has two possible states and wherein the current-direction circuit is configured to allow current to flow in only one of two possible directions dependent on an actual state of the control signal.

4. The drive circuit according to claim 3, wherein the control circuit comprises a bistable multivibrator circuit.

5. The drive circuit according to claim 1, wherein the control circuit comprises an integrator circuit, the integrator circuit being connected such that a voltage at the set of output terminals determines a charging of the integrator circuit.

6. The drive circuit according to claim 5, wherein the integrator circuit comprises an RC integrator circuit, wherein a series connection of a resistor and a capacitor is connected between two output terminals of the set of output terminals and wherein the control circuit is configured to use a node voltage at a node between the resistor and the capacitor as the input voltage.

7. The drive circuit according to claim 6, wherein a resistance of the resistor is selectable for controlling the second frequency.

8. The drive circuit according to claim 1, wherein the current-direction circuit comprises a first diode and a second diode and wherein the control signal determines which of the first diode and the second diode is enabled to conduct an electrical current.

9. The drive circuit according to claim 1, wherein the control circuit comprises a microcontroller device configured to control the control signal in dependence of the input signal.

10. The drive circuit according to claim 1, wherein the drive circuit is coupled to at least one optically switchable film.

11. The drive circuit according to claim 10, wherein the drive circuit is coupled to a plurality of segments of one or more optically switchable films.

12. An open roof assembly comprising:
a moveable closure member, wherein the moveable closure member comprises:
  an electro-optical device;
  a transformer having primary winding terminals and secondary winding terminals; and
  a drive circuit for driving the electro-optical device, the drive circuit comprising:
    a set of input terminals connected to the secondary winding terminals for receiving an alternating input voltage at a first frequency;
    a set of output terminals for supplying an alternating output voltage at a second frequency;
    a control circuit configured to generate a control signal dependent on an input signal, the input signal representing a charge state of the electro-optical device; and
    a current-direction circuit configured to control a current-flow direction of an electrical current in response to the control signal, the control circuit and the current-direction circuit thereby being configured to control the second frequency;
  and wherein the transformer and the drive circuit are mounted on the closure member.

13. A method of driving an electro-optical device, the method comprising:
receiving an alternating input voltage at a first frequency at a set of input terminals; and
generating an alternating output voltage at a second frequency at a set of output terminals, wherein the second frequency is controlled based on a monitored charge state of the electro-optical device by:
  generating a control signal dependent on an input signal, the input signal representing the monitored charge state of the electro-optical device; and
  controlling a current-flow direction of an electrical current between the input and output terminals in response to the control signal.

14. The method according to claim 13, wherein the input signal is generated by an integrator circuit comprising an RC integrator circuit, wherein a series connection of a resistor and a capacitor, wherein a resistance of the resistor is selectable for controlling the second frequency, and the method comprises selecting the resistance of the resistor to mimic a charging behavior of the electro-optical device.

15. The method according to claim 13, wherein the method further comprises determining an actual condition of the electro-optical device and wherein generating the alternating output voltage at the second frequency at the set of output terminals comprises taking into account the actual condition.

* * * * *

UNITED STATES PATENT AND TRADEMARK OFFICE
CERTIFICATE OF CORRECTION

PATENT NO. : 11,619,836 B2
APPLICATION NO. : 17/317541
DATED : April 4, 2023
INVENTOR(S) : Gerrit Schwepper It is certified that error appears in the above-identified patent and that said Letters Patent is hereby corrected as shown below:

On the Title Page

Item [73], delete "INALF ROOF SYSTEMS GROUP B.V."
And insert --INALFA ROOF SYSTEMS GROUP B.V.--

Signed and Sealed this
Fourth Day of July, 2023

Katherine Kelly Vidal
*Director of the United States Patent and Trademark Office*